United States Patent [19]

De Gaeta

[11] 3,731,985
[45] May 8, 1973

[54] BALL BEARINGS

[76] Inventor: Albert Martin De Gaeta, 133 84th Street, Brooklyn, N.Y. 11209

[22] Filed: Feb. 24, 1971

[21] Appl. No.: 118,257

Related U.S. Application Data

[63] Continuation-in-part of Ser. No. 759,560, Sept. 13, 1968, abandoned.

[52] U.S. Cl. .................................................308/194
[51] Int. Cl. ..............................................F16c 9/06
[58] Field of Search..........................308/174, 194, 35

[56] References Cited

UNITED STATES PATENTS

| 2,334,002 | 11/1943 | Heintz et al. | 308/174 |
| 2,990,222 | 6/1961 | Jones | 308/194 |
| 3,126,231 | 3/1964 | Herr | 308/35 |

Primary Examiner—Charles J. Myhre
Assistant Examiner—Frank Susko
Attorney—Robert E. Burns and Emmanuel J. Lobato

[57] ABSTRACT

A ball bearing capable of taking both radial and axial loads comprises an integral ball on the end of a shaft engaging a full circular complement of balls running in a cylindrical outer race ring and confined axially by end plates at opposite ends of the outer race ring. The outer race ring and end plates are held in an outer case formed of metal having a lower modulus of elasticity than the outer race ring and end plates. A second bearing system comprises a shaft fixed axially on at least one end of a hollow cylinder in which two balls are confined. A finger extends through an opening in the side wall of the cylinder and between the two balls to take axial thrust on the shaft in either direction. The shaft is rotatably supported by radial bearings.

12 Claims, 6 Drawing Figures

PATENTED MAY 8 1973  3,731,985

BALL BEARINGS

This application is a continuation-in-part of my copending application Ser. No. 759,560 filed Sept. 13, 1968 now abandoned.

The present invention relates to high precision ball bearings and, in particular, to ball bearings capable to taking both axial thrust and radial loads.

In a known bearing system for rotatably supporting a shaft subjected both to axial thrust loads and to radial loads, there are four bearings. The radial load is taken by two radial bearings supporting the shaft at axially spaced points, for example near its ends. The axial thrust is taken by two thrust bearings disposed at opposite ends of the shaft.

In accordance with one aspect of the present invention, a shaft is rotatably supported by only two bearings, one at each end of the shaft. Each bearing is capable of taking both radial loads and thrust in an axial direction. Moreover, the bearings of the present invention are of simple construction comprising an integral spherical ball on the end of the shaft engaging a full circular complement of balls running in a cylindrical outer race ring and confined axially by end plates at opposite ends of the outer race ring. The end plates and outer race ring are held in an outer cylindrical case which is formed of metal having a lower modulus of elasticity than the end plates and outer race ring so that the assembly is held securely without distortion of the race.

A bearing constructed in accordance with the present invention is characterized by high precision in supporting the shaft accurately without play while at the same time capable of operation at high speed, for example 60,000 to 80,000 RPM with excellent life expectancy.

In accordance with another aspect of the invention, a bearing system includes a thrust bearing capable of taking axial thrust in either direction and positioning a shaft accurately with virtually no end play. In accordance with this aspect of the invention, the thrust bearing comprises two balls confined axially and radially in a cylindrical sleeve fixed on an axially aligned shaft rotatably supported by radial ball bearings. A thrust finger projects through an opening in the side of the cylinder and fits closely between the two balls. The thrust finger holds the balls, and hence the cylinder and shaft, against movement in an axial direction while offering virtually no resistance to rotary movement of the shaft. The radial bearings are preferably high precision low friction bearings, for example of the kind disclosed in my copending patent application, Ser. No. 180, filed Jan. 2, 1970, now U.S. Pat. No. 3,610,714 as a continuation-in-part of my above-mentioned copending application Ser. No. 759,560, filed Sept. 13, 1968 now abandoned.

The nature and advantages of the invention will appear more fully from the following description of preferred embodiments shown by way of example in the accompanying drawings, in which.

Figure 1:
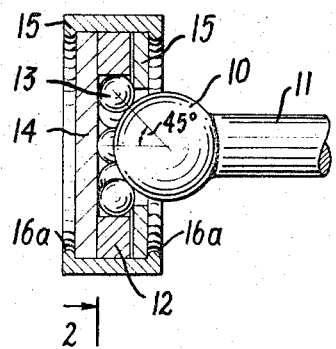
FIG. 1 is a side view, partially in axial section, of a bearing in accordance with the present invention capable of taking radial load and axial thrust.
Figure 2:
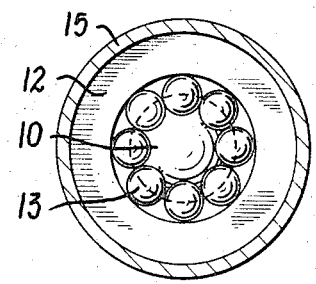
FIG. 2 is a cross-section taken approximately on the line 2—2 in FIG. 1.

In FIGS. 1 and 2, there is shown a combined radial and thrust bearing of which the inner bearing member comprises a spherical end portion 10 on a shaft 11. The spherical end portion 10 and the shaft 11 may, if desired, be formed as a single piece but, for convenience, economy and precision of manufacture, it is preferable to form the end portion as a sphere which is then secured to the end of the shaft 11, for example by welding. The outer bearing member is a ring 12 having cylindrical inner and outer surfaces and plane end faces. A full circular complement of balls 13 is disposed between the inner and outer bearing members. The dimensions of the bearing members and the balls are selected so that the center of each ball and the point of contact of the ball with the spherical end portion 10 of the shaft 11 is on a line passing through the center of the sphere 10 and disposed at an angle of 45° to the axis of the shaft. The balls are further retained by an end plate 14 which abuts one end face of the outer bearing member 12 and has a diameter approximately equal to that of the member 12. A second end plate 15 at the other end of the ring 12 has a central opening to admit the spherical portion 10 of the shaft 11 while substantially closing the annular space between the spherical portion 10 and the ring 12. The ring 12 and end plates 14 and 15 are held in a suitable housing 16 having a cylindrical portion closely embracing the outer peripheries of the ring 12 and the end plates 14 and 15 and inturned end portions 16a which extend in over the end plates so as to hold the end plates and ring 12 firmly in assembled relation. The spacing of the end plates 14 and 15 is accurately determined by the axial length of the ring 12 which is slightly greater than the diameter of the balls 13 so that the balls are held in circular alignment with one another but without any wedging or binding action between the end plates. The balls are thus held in alignment without the use of cages or similar devices such as are commonly used in ball and roller bearings. Such cages are disadvantageous in bearings where low friction is required since friction unavoidably occurs between the balls and the cage.

With the bearing construction of the invention as just described, the balls 13 have point contact with the sphere 10 and also have point contact with the cylindrical inner surface of the bearing ring 12 and with the plane inner surface of the end plate 14. Moreover, the distance between the points of contact with the ring 12 and the end plate 14 are located at the same distance from the axis about which the ball turns in rolling around the raceway formed by the ring and the end plates. Hence the balls have pure rolling contact with the sphere and with the raceway, thus avoiding slipping which would give rise to bearing wear, resistance to turning and the generation of heat in the bearing.

The other end of the shaft 11 may be supported in like manner by another bearing like that shown in FIGS. 1 and 2. Alternatively, if the shaft 11 is disposed vertically with a bearing like that of FIG. 1 at the lower end, the upper end can be supported by a radial bearing, for example a radial bearing of the kind shown in my copending application Ser. No. 180, filed Jan. 2, 1970 now U.S. Pat. No. 3,610,714.

A contributing factor in the low-friction characteristics and high speed performance of bearings in accordance with the present invention is the high precision with which the bearing parts are made. The inner surface of the outer bearing member 12 is precisely round within a tolerance of the order of 0.00001 inch, the tolerance being measured as the difference between minimum and maximum radii measured from a fixed center to the bearing surface at different locations around the bearing member. The bearing surface of the inner bearing member 10 is precisely spherical within a tolerance of 0.00001, inch the tolerance being measured as the difference between minimum and maximum radii measured from the center of the sphere. The balls 13 are precisely spherical within a tolerance of the order of 0.000001 inch the tolerance being the difference inch, minimum and maximum radii measured from a fixed center to different points of the surface of the ball. The surface finish of the balls, races and end plates is better than 2 microinches r.m.s. As will be seen in FIG. 2, there is a full complement of balls between the inner and outer bearing members, successive balls touching one another. The diameter of the balls is related to the inner diameter of the ring 12 so that the balls can turn freely but the cumulative clearance between the balls in a circumferential direction does not exceed a value of the order 0.0002 inch.

The dimensions of a ball bearing in accordance with the present invention are illustrated by the following example:

| | |
|---|---|
| Outer diameter of outer race: | 0.2095 |
| Inner diameter of outer race: | 0.158 |
| Axial length of outer race: | 0.0391 |
| Diameter of spherical inner bearing member: | 0.125 |
| Diameter of balls: | 0.039 |

A further factor in reducing the friction of the ball bearing and assuring long life in high speed operation in the nature of the materials of which the bearing components are made. The balls and races must be formed of strong, durable material which can be formed with the accuracy indicated above. Moreover, in order to have low friction values, the material of the balls and races must have a high modulus of elasticity. However, in order to secure long life and high speed operation, the modulus of elasticity of the balls should not be too high in order to provide some distribution of stresses in the ball and thereby avoid high localized stress concentration. The inner bearing member 10, outer race 12, balls 13 and end plates 14 and 15 may, for example, be formed of steel having a modulus of elasticity of the order of 30,000,000. Materials that have been found satisfactory are 52100 chrome steel, 440 C high nickel steel and an alloy known as "Elgalloy." In order for the bearing to operate at speeds of the order of 60,000 to 80,000 r.p.m., the bearing material should have a high elastic limit. Alternatively, the outer race 12 and end plates may be made of tungsten carbide having a modulus elasticity of the order of 100,000,000 p.s.i. and a compressive strength of the order of 700,000 to 1,000,000 p.s.i. A further material suitable for the end plates is sapphire or corundum having a modulus of elasticity of the order of 60,000,000 to 70,000,000 p.s.i. and a compressive strength of about 300,000 p.s.i. The weight of the sapphire or corundum material is about one-quarter that of tungsten carbide and the material has a further desirable characteristic that in the thickness used it is transparent so as to permit inspection of the balls after the bearing has been assembled.

The annular casing 16 is formed of a material having a lower modulus of elasticity than that of the outer race 12, for example a modulus below 30,000,000 p.s.i. For example, suitable materials are brass having a modulus of elasticity of about 12,000,000 to 20,000,000 p.s.i. and aluminum having a modulus of elasticity of about 10,000,000 p.s.i. The inner diameter of the casing — before assembly — is slightly less than the inner diameter of the outer race 12 so that the outer race is assembled in the casing with a press fit to assure that it is held firmly without play. The outer diameter of the end plates 14 and 15 is slightly less than that of the outer race, for example 0.001 inch less, so that they do not interfere with the secure holding of the outer race of the casing. When the lips or beads 16a are formed after the end plates, outer race and balls 3 have been assembled in the casing, it presses axially on the assembly so as to clamp the plates firmly against the end faces of the ring 12. The radial thickness of the annular casing 16 is sufficient to provide adequate strength but low enough to assure that the ring stiffness of the casing is much less than that of the outer race so that when the outer race is assembled in the casing with an interference fit, the outer race is not distorted by the casing. As the modulus of elasticity of the casing material is also a factor in ring stiffness, the radial thickness of the casing preferably varies inversely with the modulus of elasticity. For example, the wall thickness of a brass casing in the example given above is of the order of 0.005 to 0.007 inches. If the casing is made of aluminum having a modulus of elasticity of about 10,000,000 p.s.i., the wall thickness can be proportionally greater whereas if the casing is made of stainless steel having a modulus of elasticity of about 30,000,000, the wall thickness of the casing is correspondingly less.

Figure 3:
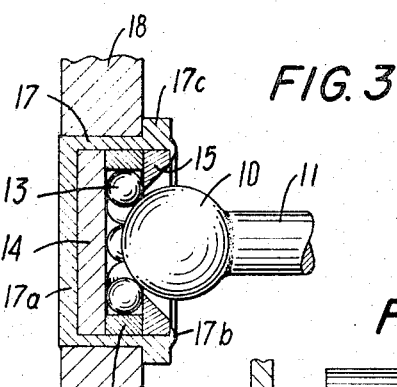
FIGS. 3 and 4 are views similar to FIG. 1 but showing modifications.

In FIG. 3, there is shown a combined radial and thrust bearing which is similar to that shown in FIGS. 1 and 2 and has corresponding parts designated by the same reference numerals. The bearing of FIG. 3 differs from that of FIGS. 1 and 2 in that the outer diameter of the outer race 12 is somewhat less and the periphery of the circular opening in the end plate 15 is beveled so as to conform more closely to the spherical inner bearing member 10. The casing 17 has one end closed by an end wall 17a while at the other end of the casing a lip 17b is turned in over the end of the end plate 15 so as to hold the outer ring 12, end plates 14 and 15 and balls 13 in assembled relation. As described with reference to FIG. 1, the ring 12 is held in the casing with an interference fit while the end plates are held against the end faces of the ring 12 by being clamped between the end wall 17a and lip 17b of the casing. The casing is further provided with an outwardly projecting flange portion 17c which serves to position the bearing in an opening of a supporting structure 18 in which the bearing is suitably secured for example with epoxy cement.

Figure 4:
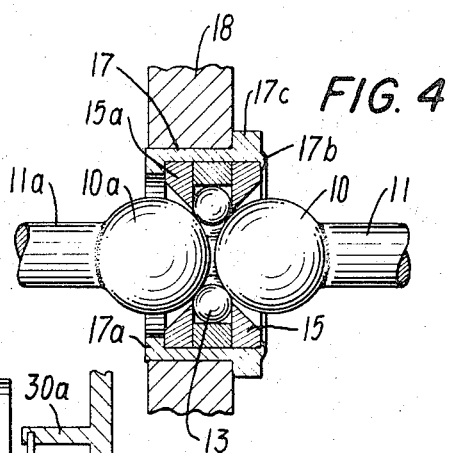

In FIG. 4, there is shown a further modification in which two inner bearing members 10 and 10a on shafts 11 and 11a, respectively, engage the circular complement of balls 13 from opposite sides. The dimensions of the bearing are such that the inner bearing surfaces 10 and 10a do not touch one another. To accommodate the two inner bearing members, the bearing has like end plates 15 and 15a, both formed with a central opening having beveled edges, the two end plates being disposed back to back with the flared openings facing outwardly. The end wall 17a of the casing 17 is also provided with a central opening to accommodate the inner bearing member 10a. Alternatively, the casing 17 is provided at opposite ends with inturned beads or flanges engaging the adjacent end faces of the end plates 15 and 15a.

Except as otherwise described, the bearing of FIG. 3 is like that of FIGS. 1 and 2 and the bearing of FIG. 4 is like that of FIG. 3.

Figure 5:
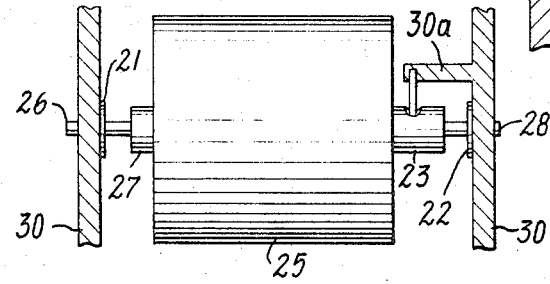
FIG. 5 is a schematic side view, partially in section, illustrating a bearing system in accordance with the invention comprising radial bearings and a single thrust bearing capable of preventing axial movement in either direction.

In FIG. 5, there is shown a bearing system capable of taking both radial and axial loads and shown as comprising two radial bearings 21 and 22 and a single thrust bearing 23. The bearing system is shown as supporting a can 25 which may, for example, contain an electric hysteresis motor rotating about an axis perpendicular to the axis of the can (such as a gyroscope gymbal). A shaft 26 extending axially from a sleeve 27 fitted into one end of the can is supported by the radial bearing 21. The thrust bearing 23 is fitted axially into the opposite end of the can and a shaft 28 in axial alignment with the shaft 26 extends from the thrust bearing 23 and is supported by the other radial bearing 22. The radial bearings 21 and 22 are mounted in a supporting structure 30 and support the shafts 26 and 28, and hence the can 25, for rotation. The single thrust bearing 23 holds the assembly, including the can 25 and shafts 26 and 28, against movement in an axial direction.

Figure 6:
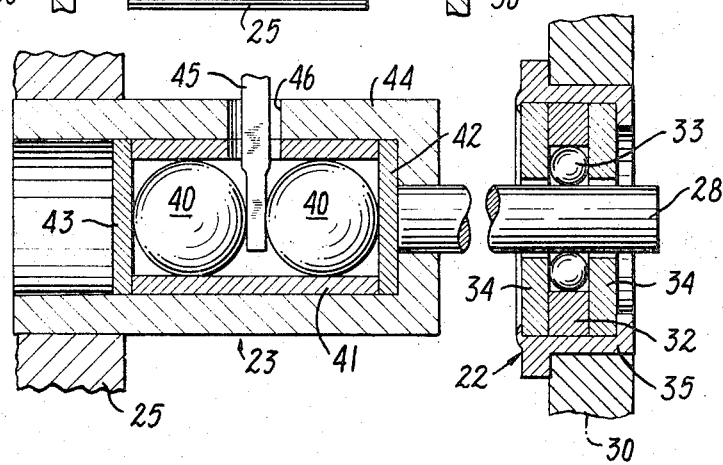
FIG. 6 is an enlarged axial section showing the thrust bearings and one of the radial bearings of the bearing system shown in FIG. 5.

The thrust bearing 23 and one of the radial bearings (which are alike) are shown on a larger scale and in more detail in FIG. 6. The radial bearings are preferably of the kind shown and described in my copending patent application Ser. No. 180, filed Jan. 2, 1970 now U.S. Pat. No 3,610,714. Each comprises an outer race 32 and a full circular complement of balls 33, the shaft here shown as shaft 28 constituting the inner race for the balls. The balls are retained in an axial direction by end plates 34 which engage opposite ends of the outer race 32. The outer race 32 and end plates 34 are held in assembled relation in a casing 35 which is fitted into an opening provided in the supporting structure 30. The structure and characteristics of the bearing are preferably as described in the above-mentioned patent application Ser. No. 180 now U.S. Pat. No. 3,610,714 and provide rotary support for the shaft with minimum friction and minimum play.

The thrust bearing 23 is shown as comprising two spherical balls 40 axially disposed in a cylindrical outer race 41. The balls are confined in a direction axial of the outer race 41 by end plates 42 and 43. The cylindrical outer race 41 and end plates 42, 43 are assembled in a housing in the form of a sleeve 44 one end of which is press-fitted into an opening in one end of the can 25 while the shaft 28 is press-fitted into the opposite end of the sleeve 44 so as to provide a rigid assembly. A finger 45 rigidly carried by a portion 30a of the supporting structure 30 extends through an opening 46 in the side wall of the casing 44 and outer race 41 and projects in between the two balls 40. The inner portion of the finger 45 disposed between the two balls has opposite flat faces engaged by the balls while the upper portion of the finger may be of round cross-section.

With the construction shown, it will be seen that the length of the cylindrical outer race 41 determines the spacing of the two end plates 42 and 43. The spacing of the end plates 42, 43 is essentially equal to the sum of the diameters of the two balls 40 and the thickness in a direction axial of the bearing of the portion of the finger 45 disposed between the balls. Tolerances are such as to provide an end play in a direction axial of the bearing of only about 0.0001 to 0.0002 inch. The internal diameter of the cylindrical outer race 41 exceeds the outer diameter of the balls by only about 0.0005 to 0.001 inch. In a typical constructions, the balls 40 have a diameter of about 1 mm, the other parts of proportional dimensions.

The balls 40, cylindrical outer race 41 and end plates 42 and 43 are preferably all formed of material having the same thermal coefficient of expansion so that the tolerances are not affected by changes in temperature. Moreover, the balls 40, cylindrical outer race 41 and end plates 42 and 43 are preferably formed of material having a modulus of elasticity of at least 60,000,000 p.s.i. A suitable material is tungsten carbide having amodulus of elasticity of about 90,000,000 p.s.i. The casing 44 is formed of material having a lower modulus of elasticity than the cylindrical outer race 41, for example a modulus of elasticity less than 30,000,000 p.s.i. A suitable material is brass having a modulus of elasticity of the order of 12 to 20,000,000 p.s.i.

In assembling the thrust bearing 23, the first end plate 42 is inserted in the casing 44 and positioned against the closed end of the casing. The end plate 42 fits snugly in the casing but without interference fit. The cylindrical outer race 41 is then pressed into the sleeve 44 with an interference fit. Finally, the second end plate 43 is pressed into the sleeve 44, likewise with an interference fit. By reason of the casing being formed of a material having a lower modulus of elasticity than the cylindrical outer race 41 and the end plates 42 and 43, the race and end plates are assembled in the casing in the manner described without material distortion.

The opening 46 in the casing 43 and outer race 41 is of sufficient angular extent to permit rotary movement of the thrust bearing and hence of the can 25 through a selected angle. In installations with which the bearing system is used, the angular movement is generally of small magnitude, not exceeding a few degrees. As described in my copending application Serial No. 180, the radial bearings 21 and 22 have exceptionally low resistance to rotation of the shaft. Likewise, the thrust bearing 23 has exceptionally low resistance to rotation of the shaft while preventing axial movement of the shaft and rotary assembly in either direction. It is hence necessary to use only one thrust bearing. It will be understood that the arrangement of the bearings can be varied as desired. Thus, for example, both radial bearings may be at the same side of the load instead of having the load between them as illustrated in FIG. 5. The single thrust bearing can be located whereever desired along the length of the shaft and may, for example, be disposed on a projecting end of the shaft.

While preferred embodiments of the invention have been shown by way of example in the drawings, it will be understood that the invention is in no way limited to the particular examples shown and described.

What I claim and desire to secure by letters patent is:

1. A precision ball bearing comprising an outer race member having a cylindrical outer surface, a cylindrical inner surface defining a ball raceway and planar end faces perpendicular to the axis of said raceway, two end plates having planar inner faces abutting respectively the opposite end faces of said outer race member, an outer casing embracing said outer race member and end plates and having inwardly extending end portions engaging said end plates to secure said outer race member and end plates in assembled relation, a full circular complement of bearing balls inside said outer race member and between said end plates, said balls having a diameter slightly less than the distance between said end plates, one of said end plates having a central circular opening larger than a circle defined by the innermost portions of said balls and smaller than a circle defined by the centers of said balls, a shaft having an integral spherical end portion having a diameter smaller than the diameter of said ball raceway and larger than a circle defined by the innermost portions of said balls, said spherical end portion entering said opening in said one end plate and engaging said balls so as to be supported both radially and axially by said balls, the interengaging surfaces of said spherical end portion, outer race member and balls being precisely round and said spherical end portion, outer face member and balls having a modulus of elasticity at least of the order of 30,000,000 p.s.i., said balls having point contact with said spherical end portion of said shaft and with the cylindrical inner surface of said outer race member and the planar surface of the other of said end plates, and the distances from said points of contact with said outer race and end plate to the axis about which each ball turns in rolling around the raceway being equal to one another, whereby said balls have pure rolling contact with said spherical end portion of said shaft, said outer race member and said other end plate.

2. A precision ball bearing according to claim 1, in which the end plate opposite said spherical end portion has a modulus of elasticity at least of the order of 60,000,000 p.s.i.

3. A precision ball bearing according to claim 1, in which said outer race member has a modulus of elasticity at least of the order of 60,000,000 p.s.i.

4. A precision ball bearing according to claim 1, in which the maximum variation in roundness of said balls is one millionth of an inch.

5. A precision ball bearing according to claim 1, in which the maximum variation in the size of the balls is one millionth of an inch.

6. A precision ball bearing according to claim 1, in which the maximum variation in roundness of said ball raceway is one hundred thousandth of an inch.

7. A precision ball bearing according to claim 1, in which the maximum variation in roundness of the portion of said spherical end portion engaged with said balls is one hundred thousandth of an inch.

8. A precision ball bearing according to claim 1, in which radii of said spherical end portion extending to points of engagement of said spherical end portion with said balls are disposed at an angle of 45° to the axis of said shaft.

9. A precision ball bearing according to claim 1, in which said outer member fits in said casing with an interference fit and said end plates fit in said casing snugly but freely and are held fixed by being clamped between the end faces of said outer race member and said inwardly extending end portions of said casing.

10. A precision ball bearing according to claim 1, in which said casing has a modulus of elasticity not exceeding 20,000,000 p.s.i.

11. A precision ball bearing according to claim 10, in which said casing is fitted into an opening in a support and has a radially outwardly projecting rim engaging said support to position said casing in an axial direction.

12. A precision ball bearing according to claim 1, in which both said end plates have like circular central openings and in which two said shafts have integral spherical end portions entering the circular openings of opposite end plates respectively and engaging said balls from opposite directions.

* * * * *